United States Patent [19]

Houghtaling

[11] 4,044,107
[45] Aug. 23, 1977

[54] PROCESS FOR THE MANUFACTURE OF WET PROCESS PHOSPHORIC ACID USING WET-GRINDING OF THE PHOSPHATE ROCK FEED

[75] Inventor: Samuel V. Houghtaling, Lakeland, Fla.

[73] Assignee: Davy Powergas, Inc., Lakeland, Fla.

[21] Appl. No.: 597,337

[22] Filed: July 21, 1975

Related U.S. Application Data

[63] Continuation of Ser. No. 416,647, Nov. 16, 1973, abandoned.

[51] Int. Cl.$^2$ ............................................. C01B 25/16
[52] U.S. Cl. .................................. 423/320; 241/21; 423/167
[58] Field of Search ................. 423/167, 320; 241/15, 241/16, 30, 21

[56] References Cited

U.S. PATENT DOCUMENTS

| | | | |
|---|---|---|---|
| 114,693 | 5/1871 | Lewis | 241/21 |
| 1,667,549 | 4/1928 | Heckenbleikner | 423/320 |
| 2,710,247 | 6/1955 | Knowles et al. | 423/320 |
| 3,017,247 | 1/1902 | Huxley | 423/320 |
| 3,117,733 | 1/1964 | Cleeman | 241/21 |
| 3,192,014 | 6/1965 | Leyshon et al. | 423/320 |
| 3,204,877 | 9/1965 | Barr et al. | 241/15 |
| 3,231,331 | 1/1966 | Robinson | 423/320 |
| 3,257,168 | 6/1966 | Chelminski | 423/320 |
| 3,594,123 | 7/1971 | Enck et al. | 423/320 |
| 3,653,827 | 4/1972 | Hey et al. | 423/320 |

FOREIGN PATENT DOCUMENTS 615,987 7/1958 Canada

OTHER PUBLICATIONS

*Phosphoric Acid* Slack, 1969, 187, 183, 200, 201.

*Primary Examiner*—O. R. Vertiz
*Assistant Examiner*—Eugene T. Wheelock
*Attorney, Agent, or Firm*—Bernard & Brown

[57] ABSTRACT

Wet process phosphoric acid is made by grinding phosphate rock as a slurry in water, and digesting the ground rock slurry with sulfuric acid which has been diluted by spent calcium sulfate wash water before being combined with the ground slurry.

6 Claims, 1 Drawing Figure

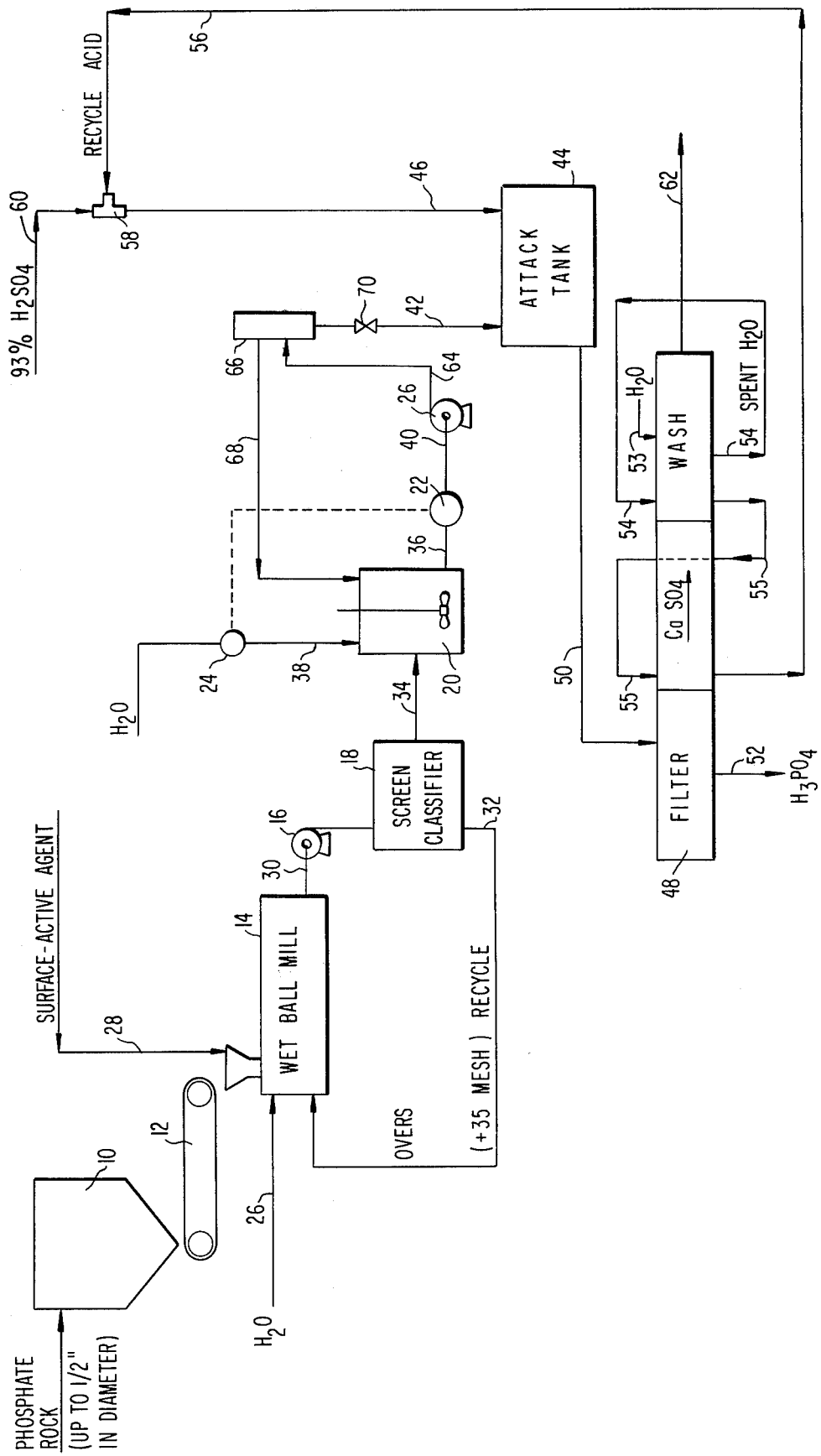

PROCESS FOR THE MANUFACTURE OF WET PROCESS PHOSPHORIC ACID USING WET-GRINDING OF THE PHOSPHATE ROCK FEED

This is a continuation, of application Ser. No. 416,647, filed Nov. 16, 1973 now abandoned.

This invention relates to the manufacture of wet process phosphoric acid. More particularly, it relates to that portion of the wet process of manufacturing phosphoric acid from the grinding of the phosphate rock to the filtering of the product slurry from the attack tank.

The manufacture of phosphoric acid by the wet process involves reacting phosphate rock with sulfuric acid to yield calcium sulfate and phosphoric acid. By the present invention is provided a unique combination and sequence of steps in such a process which serve to render the process more efficient and economical than has heretofore been the case. The steps involved are i. grinding an aqueous slurry of the phosphate rock containing at least about 20 weight percent water sufficiently that the phosphate rock will pass a 30 mesh (Tyler) screen;

ii. passing the slurry of ground rock to an attack tank and therein contacting and reacting the slurry with diluted sulfuric acid obtained from step (vi) herein to yield a product slurry of crystalline hydrated calcium sulfate in phosphoric acid;

iii. removing said product slurry from the attack tank;

iv. subjecting said product slurry to a separation step whereby the crystalline hydrated calcium sulfate is separated from the phosphoric acid;

v. washing the separated calcium sulfate with water;

vi. mixing the spent calcium sulfate wash water with concentrated sulfuric acid to obtain diluted sulfuric acid;

and (vii) passing the diluted sulfuric acid to step (ii) above.

In one preferred embodiment, a surface-active agent, such as a defoamer, may be added to the slurry of ground rock obtained from step (i) above in order to produce advantageous pumping properties in the slurry, particularly when a low water content slurry, e.g. about 20 to 22% water, is used.

In another preferred embodiment, the slurry is passed to an attack tank, as in step (ii) above, via a constant head overflow pipe from which the flow rate is controlled with a control valve.

In the method of this invention, the grinding of the slurry of the phosphate rock can be performed in conventional apparatus such as a ball mill, rod mill, roller mill, or cage mill. The purpose of the grinding is to increase the surface area of the rock and thereby provide for a faster and more complete reaction of the rock with the sulfuric acid. As stated above, the extent of the grinding is preferably sufficient that the comminuted rock will pass a 30 mesh (Tyler) screen. A finer grind, e.g. to pass a 50 mesh screen, may also be used and may even be preferred in some instances. Most preferably there is sufficient water present in the slurry in the grinder to render the slurry pumpable. This will usually be at least about 20 or 22 percent, based on the weight of the slurry. Included in this figure is whatever water, usually no more than 30 weight percent, say about 8 to 12 percent, that is present in the unground rock as it is received from the mine. It is generally wasteful to have more than about 35 weight percent water in the slurry, and the most advantageous range of water content during the grinding operation is about 28 or 30 to 35 percent.

Fresh water is generally preferred for use in the grinding operation; however, gypsum pond water containing up to 2 percent $P_2O_5$ can be used if desired. If such pond water is used it is advisable to take precautions against corrosion in the mill, for example by using a rubber-lined mill and non-corrodable balls.

The use of wet, rather than dry, grinding provides several advantages for the process of the present invention: dust pollution is largely eliminated; rock drying is eliminated; conveying the resulting slurry is easier than transporting dry rock; and metering of the desired amount of ground rock to the attack tank can be performed more accurately and reliably when the rock is in slurry form.

After grinding, the slurry is passed to the attack tank from the grinding apparatus and may first be subjected to screen classification to assure that the phosphate rock in the slurry will essentially pass a 30 mesh (Tyler) screen. The slurry may be passed from the grinding apparatus, with or without screen classification, to the attack tank by any known transport method. Particularly preferred is a constant head overflow pipe arrangement including a control valve for flow rate control.

As mentioned above it may often be advantageous to add to the slurry of ground rock, either before or after it leaves the mill, a surface-active agent which will enhance the pumpability of the slurry. The surface-active agent may be inorganic or organic, and if the latter, may be anionic, cationic, nonionic or amphoteric. As examples of suitable organic surface-active agents may be mentioned the sulfonated natural fats and oils such as tall oil, as well as their sulfonated acids. As examples of suitable inorganic surface-active agents may be mentioned the alkali metal phosphates such as sodium tripolyphosphate.

It may be doubly advantageous to select a surface-active agent which will also serve to inhibit foam in the attack tank. As examples of such foam-inhibiting surface-active agents may be mentioned "Sul-Fon-ate OA-5 (manufactured by Tenneco), Hess, D-501" (manufactured by Hess Oil), "Hodag PH96E" (manufactured by Hodag Chemical), "AZ-10W" (manufactured by A-Z Products), "Arizona 302" (manufactured by Arizona Chemical), "Bronoco, 202" (manufactured by Bronoco Solvents and Chemicals Co.), "Drew Liquid Defoamer 913BL" (manufactured by Drew Chemical Corporation), "Sulfated Tall Oil" (manufactured by Union Bogcamp Paper Corp.), "Betz Formula XL-117" (manufactured by Betz Laboratories, Inc.), and "Shell P5T" (manufactured by Shell), all of which are primarily sulfonated tall oils and fatty acids.

The amount of surface-active agent to be used will depend upon the solids level in the slurry, the chemical identity of the particular agent employed, etc. Generally, however, it will be satisfactory to use up to about 7 pounds of surface-active agent per ton of rock (dry basis), e.g. about 1–5 lbs. per ton of rock.

The slurry of ground rock which is passed to the attack tank is admixed and reacted with sulfuric acid. The desired concentration of the sulfuric acid is determined by the desired strength of the phosphoric acid obtained from the attack tank. Generally it will be desired to obtain a phosphoric acid having a $P_2O_5$ value of at least about 25, preferably about 28 to 32, weight percent, which will usually require using a sulfuric acid having a concentration of at least about 90 percent, preferably about 92 to 98 percent. As compared to processes which introduce dry rock into the attack tank and therein admix it with relatively dilute sulfuric acid, the process of the present invention offers a great advantage in that the expense of drying the rock to remove the moisture it contains when it leaves the mine is avoided. This factor alone can represent a savings of about $0.60 to $1.00 per ton of phospate rock used.

The sulfuric acid that is introduced to the attack tank is acid that has been diluted somewhat by having been pre-mixed with spent wash water from the water washing of the calcium sulfate crystals obtained from a previous product slurry from the attack tank. This pre-mixing of the relatively concentrated sulfuric acid with the spent calcium sulfate wash water provides a distinct advantage over processes wherein the concentrated sulfuric acid and recycled wash water are separately introduced to the attack tank, in that the latter method results in an excessively high sulfate ion concentration in the vicinity of the point of entry of the concentrated sulfuric acid, causing phosphate rock particles in that vicinity to become coated with gypsum and thereby made less accessible to the desired attack by the sulfuric acid.

Thus it is seen that the water content in the attack tank slurry is essentially supplied by three ingredients: the rock slurry from the grinder, the concentrated sulfuric acid raw material, and the spent calcium sulfate wash water. Of the total amount of water in the attack tank, usually no more than about 5 percent, say about 1 to 5 percent, is supplied by the concentrated sulfuric acid; about 15 to 35 percent is usually supplied by the slurry of ground rock; and about 60 to 85 percent is supplied by the recycled wash water.

Separation of the hydrated calcium sulfate crystals from the phosphoric acid mother liquor can be accomplished by conventional means, such as by filtration on a tilting pan vacuum filter. The separated crystals are then washed with water, preferably 2 or 3 times and preferably countercurrently, in order to recover the phosphoric acid that has adhered to them. The spent wash water will generally have a $P_2O_5$ value of about 15 to 25, most often about 20 to 23, weight percent. The washed calcium sulfate, or gypsum, is disposed of as waste material.

The mixing of the spent calcium sulfate wash water with the concentrated sulfuric acid is accomplished in any suitable mixing device, for example a mixing tee.

The invention will be better understood by considering the following example and the attached drawing.

EXAMPLE

The attached drawing is a block diagram depicting a process for producing 30% $P_2O_5$ phosphoric acid by the method of the present invention. Referring to the drawing, mined phosphate rock, which is generally about ½ inch diameter in size and comprises about 8 to 12 weight percent water, is introduced into wet rock bin 10. The rock is then delivered from the wet rock bin to wet ball mill 14 via belt conveyor 12. As a modification, the plant may alternatively employ a turntable feeder rather than the belt conveyor.

Fresh water is supplied to ball mill 14 via inlet line 26 in an amount sufficient to provide a total water content in the slurry withdrawn from the ball mill of about 30 to 35 weight percent. A surface-active agent, effective to increase the pumpability of the slurry in the ball mill and to inhibit foam formation in the attack tank, is added to the ball mill via line 28. Grinding is conducted for a sufficient time to reduce the particle size of the phosphate rock so that most of it will pass a 30 mesh (Tyler) screen.

The effluent slurry from the wet ball mill is withdrawn via line 30 and is pumped by pump 16 into screen classifier 18. The screen classifier separates plus 30 mesh particles (overs) from the slurry, and the overs are recycled via line 32 to wet ball mill 14 for further comminution.

The on size slurry (at least 99.5 percent of the solids being minus 30 mesh) is passed from screen classifier 18, via line 34, to surge tank 20. Surge tank 20 is agitated and rubber lined. The slurry is withdrawn from the surge tank via line 36 and is passed through a magnetic flow meter 22. The magnetic flow meter is in communication with variable speed pump 24 which regulates the rate of addition of water, e.g. pond water, via line 38 to the surge tank to make a slurry of 35 weight percent water in line 40.

The slurry in line 40 is passed via pump 26 and line 64 to constant head overflow pipe 66. Overflow slurry from overflow pipe 66 is recycled to surge tank 20 via line 68. Slurry is metered out of overflow pipe 66 via control valve 70 and line 42 to attack tank 44 wherein it is contacted and reacted with sulfuric acid having a concentration of about 28% which is supplied to the attack tank via line 46. Residence time in the attack tank is about 6 hours.

Approximately 30% of the total water in attack tank 44 comes from the slurry introduced via line 42, and the balance comes essentially from the sulfuric acid introduced via line 46.

As the reaction progresses in the attack tank, crystals of hydrated calcium sulfate are formed in the reaction mixture. The reaction mixture is withdrawn from attack tank 44 via line 50 and is conducted to filter 48 (e.g. a Prayon filter) for separation of the crystals from the product phosphoric acid. The phosphoric acid filtrate, having a $H_3PO_4$ concentration of about 41 weight percent (equalling 30% $P_2O_5$), an $H_2O$ content of about 55%, and containing about 4% impurities, is removed from the system via line 52. If desired, the filtrate can be conducted to an evaporation stage (not shown) wherein it can be concentrated, say to a strength of about 52% $P_2O_5$.

The hydrated calcium sulfate crystals on filter 48 are washed three times countercurrently with water supplied via pipe 53 and passed through pipes 54 and 55 in order to recover the phosphoric acid adhering to them, and are then withdrawn from the process via line 62 as gypsum waste material. The spent wash water, which has a $P_2O_5$ concentration of about 22%, is conducted via line 56 to a mixing tee 58. In mixing tee 58 the spent calcium sulfate wash water is mixed with sulfuric acid having a concentration of about 93%, supplied by line 60, to provide the 28% sulfuric acid that is conducted to the attack tank 44 via line 46. Of the total water in the attack tank about 3% comes from the concentrated sulfuric acid of line 60 and about 67% comes from the spent wash water supplied by line 56.

I claim:

1. A method of manufacturing wet process phosphoric acid from phosphate rock, comprising the steps of
   i. grinding the phosphate rock in a water slurry sufficiently that the phosphate rock will pass a 30 mesh (Tyler) screen, said slurry containing at least about 20 weight percent water, and said slurry being formed with water containing no more than 2 percent $P_2O_5$;

ii. passing the slurry of ground rock to an attack tank and therein contacting and reacting the slurry with diluted sulfuric acid obtained from step (vi) herein to yield a product slurry of crystalline hydrated calcium sulfate in phosphoric acid having a $P_2O_5$ value of at least about 25 weight percent, said slurry providing about 15 to 35 weight percent of the water present in said attack tank;

iii. removing said product slurry from the attack tank;

iv. subjecting said product slurry to a separation step whereby the crystalline hydrated calcium sulfate is separated from the phosphoric acid;

v. washing the separated calcium sulfate with water and obtaining spent wash water having a $P_2O_5$ value of about 15 to 25 weight percent;

vi. mixing the spent calcium sulfate wash water with concentrated sulfuric acid having a concentration of at least about 90 percent to obtain diluted sulfuric acid; and vii. passing the diluted sulfuric acid to step (ii) above to supply about 60 to 85% of the total amount of water in the attack tank, said concentrated sulfuric acid supplying up to about 5 percent of the water present in said attack tank.

2. The method of claim 1 wherein a surface-active agent is added to the slurry of rock in step (i) in an amount sufficient to increase the pumpability of the slurry of ground rock.

3. The method of claim 2 wherein the surface-active agent is also effective as a foam inhibitor in the attack tank in step (ii).

4. The method of claim 1 wherein sufficient water is present in the attack tank in step (ii) to yeild phosphoric acid having a $P_2O_5$ value of about 28 to 32 weight percent.

5. The method of claim 4 wherein the phosphate rock slurry of step (i) contains about 22 to 35 weight percent water.

6. The method of claim 1 wherein in step (ii) the slurry of ground rock is passed to an attack tank via a constant head line from which the flow rate of the slurry of ground rock into the attack tank is controlled by a control valve.

* * * * *